Figure 1:
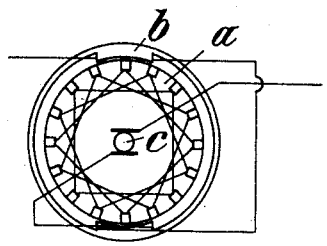

April 14, 1931. K. VON DREGER 1,801,183
ELECTRIC MOTOR
Filed June 26, 1928

Inventor:
Karl von Dreger
By
Attorney.

Patented Apr. 14, 1931

1,801,183

UNITED STATES PATENT OFFICE

KARL von DREGER, OF SASHALOM, HUNGARY

ELECTRIC MOTOR

Application filed June 26, 1928, Serial No. 288,511, and in Germany November 18, 1927.

This invention concerns improvements in or relating to talking machines, such as gramophones, having electrical driving means.

Electric motors have already been used in gramophones for driving the plates employed to support the records, these motors being of the usual type in which the speed of revolution of the motor shaft is reduced by making the armature and the magnetic field of larger dimensions if it is desired to reduce the speed of revolution of the motor shaft to the speed of rotation requisite for the records.

Motors of this kind have, however, a comparatively large diameter and volume so that they are not suitable for machines in which it is important to conform to small limits in respect of space, as is the case for example with portable gramophones. The use of portable machines is, as is well known, becoming more and more popular because they do not require any special cabinet for their setting up and, morever, because they can be conveniently put away in the room and carried from place to place. If such a portable machine were furnished with a motor of the ordinary kind then scarcely any space would be left for the accoustic part of the apparatus unless the portable machine were made disproportionately large and heavy. The same applies to all talking machines or gramophones in which the use of an electric motor of the hitherto usual type was rendered impossible by the restricted limits imposed on the space which might be occupied thereby.

The principal object of the present invention is, therefore, to provide a motor the weight of and space occupied by which are materially less than has hitherto been the case, enabling the accoustic part of the apparatus to be satisfactorily accommodated. The use of motors according to the invention also has the advantage of substantially reducing the cost of talking machines and gramophones. In the motor according to the invention, which is built on principles of construction differing from those of normal motors, reduction of the speed of rotation of the motor shaft is effected by mechanical braking and the electrical realtionship between the armature and field is so designed that the dimensions of the field are almost negligible relatively to the dimensions of the armature, the number of lines of force in the field being thereby materially reduced; if this principle is followed, then the lines of force in the armature are increased. Hereby a series current motor of extremely high speed of rotation but extremely low power is arrived at which however is quite sufficient for driving the record. Evolution of heat in the windings and in the armature is reduced by making the cross sections of the wire and of the armature itself large in relation to the field.

Figure 2:
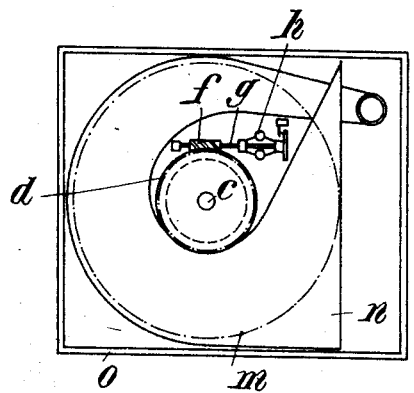
Figure 3:
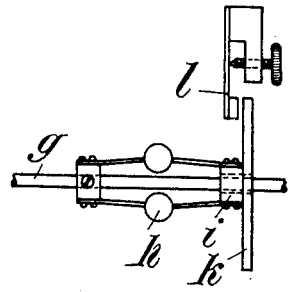

One embodiment of the invention is illustrated by way of example in the accompanying drawing in which:

Fig. 1 is a diagrammatic plan view of a motor according to the invention,

Fig. 2 a similar view of a gramophone having a brake device accommodated in a box and Fig. 3 illustrates a particular construction of brake device.

The armature $a$ of the motor is surrounded by a field $b$ (Fig. 1) which is of such small dimensions or has such slight bulk that a small number of lines of force only are formed in it. The result of this will be an increase in the speed of rotation of the motor shaft $c$ and a reduction of the power developed as compared with a similar motor of more normal design. To reduce the speed of the motor shaft to a value appropriate for the rotation of the record, said shaft carries a worm wheel $d$ engaging with a warm $f$ on a shaft $g$. The shaft $g$ carries a centrifugal governor $h$ the displaceable sleeve $i$ of which supports a disc $k$ adapted to be braked on a braking plate $l$ to, say, 80 revolutions per minute. The braking plate $l$ is spring mounted and loaded and is adjustable by means of a screw (Fig. 3). An extremely small motor diameter is arrived at in this manner; in general said diameter amounts at most to half the diameter of a normal record $m$ (say 25 cms.) so that the sound cone or horn $n$ may still be accommodated for the most part below the record. The box $o$ need, therefore, be no wider than the diameter of the records.

Having now particularly described and ascertained the nature of my said invention and in what manner the same is to be performed, I declare that what I claim is:

An electric motor, especially for the record plate of a talking machine, comprising an armature winding; an exciting field winding which has few turns compared with those of the armature winding, the cross-section of the wire of the field winding and the armature winding being so large that substantially no heating takes place at high idle speed and low driving speed; the armature being mounted on the shaft on which the record plate is mounted; and a centrifugal governor connected to the armature shaft to maintain the armature shaft at the desired speed at low power.

In testimony whereof I have affixed my signature.

KARL von DREGER.